United States Patent
Avner et al.

(10) Patent No.: US 9,613,139 B2
(45) Date of Patent: *Apr. 4, 2017

(54) SYSTEM AND METHODS THEREOF FOR REAL-TIME MONITORING OF A SENTIMENT TREND WITH RESPECT OF A DESIRED PHRASE

(75) Inventors: Amit Avner, Herzliya (IL); Omer Dror, Tel Aviv (IL); Itay Birnboim, Tel Aviv (IL)

(73) Assignee: Taykey Ltd., Herzliya (IL)

(*) Notice: Subject to any disclaimer, the term of this patent is extended or adjusted under 35 U.S.C. 154(b) by 908 days.

This patent is subject to a terminal disclaimer.

(21) Appl. No.: 13/237,538

(22) Filed: Sep. 20, 2011

(65) Prior Publication Data

US 2012/0011158 A1  Jan. 12, 2012

Related U.S. Application Data (63) Continuation-in-part of application No. 13/214,588, filed on Aug. 22, 2011, now Pat. No. 8,965,835.
(Continued)

(51) Int. Cl.
*G06F 17/30* (2006.01)
*G06F 17/27* (2006.01)
*G06Q 30/02* (2012.01)

(52) U.S. Cl.
CPC .... *G06F 17/30737* (2013.01); *G06F 17/2785* (2013.01); *G06Q 30/02* (2013.01)

(58) Field of Classification Search
USPC ........................................ 707/737, 748, 777
See application file for complete search history.

(56) References Cited

U.S. PATENT DOCUMENTS 6,463,430 B1   10/2002   Brady et al.
7,426,499 B2   9/2008   Eder
(Continued)

FOREIGN PATENT DOCUMENTS

JP   2000305952   11/2000
KR   20090034052   4/2009
(Continued)

OTHER PUBLICATIONS

International Searching Authority, "International Search Report and Written Opinion" for the corresponding International Patent Application PCT/IL2011/028846; Date of Mailing: Sep. 28, 2011.

*Primary Examiner* — Shyue Jiunn Hwa
(74) *Attorney, Agent, or Firm* — M&B IP Analysts, LLC (57) ABSTRACT

A method for real-time monitoring of changes in a sentiment respective of an input non-sentiment phrase. The method comprises receiving the input non-sentiment phrase and at least one tendency parameter respective of the input non-sentiment phrase; identifying in a data storage at least one of a term taxonomy that includes the input non-sentiment phrase, wherein the data storage contains a plurality of phrases including sentiment phrases, non-sentiment phrases, and a plurality of term taxonomies; computing a sentiment trend for the at least one term taxonomy; monitoring the sentiment trend to detect real-time changes in a direction of the sentiment trend with respect to the at least one tendency parameter; and generating at least a notification when a change in the direction of the sentiment trend with respect to the input tendency parameter has occurred.

21 Claims, 9 Drawing Sheets

Related U.S. Application Data which is a continuation-in-part of application No. 13/050,515, filed on Mar. 17, 2011, now Pat. No. 8,930,377.

(60) Provisional application No. 61/316,844, filed on Mar. 24, 2010.

(56) References Cited

U.S. PATENT DOCUMENTS

| | | |
|---|---|---|
| 7,428,554 B1 | 9/2008 | Coberley et al. |
| 7,433,876 B2 | 10/2008 | Spivack et al. |
| 7,620,628 B2 | 11/2009 | Kapur et al. |
| 7,865,354 B2 | 1/2011 | Chitrapura et al. |
| 8,600,796 B1 | 12/2013 | Sterne et al. |
| 8,631,122 B2 | 1/2014 | Kadam et al. |
| 8,635,103 B1 | 1/2014 | West et al. |
| 8,818,788 B1 | 8/2014 | Mihalik et al. |
| 2004/0003402 A1 | 1/2004 | McKenna |
| 2006/0010029 A1 | 1/2006 | Gross |
| 2006/0242017 A1 | 10/2006 | Libes et al. |
| 2007/0050389 A1 | 3/2007 | Kim et al. |
| 2007/0100779 A1 | 5/2007 | Levy |
| 2007/0106627 A1 | 5/2007 | Srivastava et al. |
| 2007/0143296 A1 | 6/2007 | Casion |
| 2007/0192300 A1 | 8/2007 | Reuther et al. |
| 2007/0208728 A1 | 9/2007 | Zhang et al. |
| 2007/0276676 A1 | 11/2007 | Hoenig et al. |
| 2008/0027769 A1 | 1/2008 | Eder |
| 2008/0082463 A1 | 4/2008 | Cheng et al. |
| 2008/0109285 A1 | 5/2008 | Reuther et al. |
| 2008/0126411 A1 | 5/2008 | Zhuang et al. |
| 2008/0133488 A1* | 6/2008 | Bandaru et al. ............... 707/3 |
| 2008/0189269 A1 | 8/2008 | Olsen |
| 2008/0208820 A1 | 8/2008 | Usey et al. |
| 2008/0215607 A1 | 9/2008 | Kaushansky et al. |
| 2008/0243531 A1 | 10/2008 | Hyder et al. |
| 2008/0249764 A1* | 10/2008 | Huang et al. ................. 704/9 |
| 2008/0250065 A1 | 10/2008 | Barrs et al. |
| 2008/0263589 A1 | 10/2008 | Jacobson et al. |
| 2008/0281915 A1 | 11/2008 | Elad et al. |
| 2009/0006525 A1 | 1/2009 | Moore |
| 2009/0077069 A1 | 3/2009 | Polanyi et al. |
| 2009/0125374 A1 | 5/2009 | Deaton et al. |
| 2009/0164400 A1 | 6/2009 | Amer-Yahia et al. |
| 2009/0164897 A1 | 6/2009 | Amer-Yahia et al. |
| 2009/0193011 A1* | 7/2009 | Blair-Goldensohn et al. ... 707/5 |
| 2009/0216581 A1* | 8/2009 | Carrier et al. ................ 705/7 |
| 2009/0216757 A1 | 8/2009 | Sen et al. |
| 2009/0292584 A1 | 11/2009 | Dalal et al. |
| 2009/0299826 A1 | 12/2009 | Hyder et al. |
| 2010/0004974 A1 | 1/2010 | Libby et al. |
| 2010/0036718 A1 | 2/2010 | Hamilton, II et al. |
| 2010/0042403 A1 | 2/2010 | Chandrasekar et al. |
| 2010/0050118 A1 | 2/2010 | Chowdhury et al. |
| 2010/0070293 A1 | 3/2010 | Brown et al. |
| 2010/0100537 A1 | 4/2010 | Druzgalski et al. |
| 2010/0138291 A1 | 6/2010 | Silverman et al. |
| 2010/0138451 A1 | 6/2010 | Henkin et al. |
| 2010/0235219 A1 | 9/2010 | Merrick et al. |
| 2010/0262454 A1* | 10/2010 | Sommer et al. ............. 705/10 |
| 2011/0004483 A1 | 1/2011 | Ting et al. |
| 2011/0099207 A1 | 4/2011 | Brown et al. |
| 2011/0112900 A1 | 5/2011 | Sanghavi |
| 2011/0137906 A1* | 6/2011 | Cai et al. ..................... 707/740 |
| 2011/0161312 A1 | 6/2011 | Wallman |
| 2011/0213655 A1 | 9/2011 | Henkin et al. |
| 2011/0225048 A1 | 9/2011 | Nair |
| 2011/0238485 A1 | 9/2011 | Haumont et al. |
| 2011/0251887 A1 | 10/2011 | Paul et al. |
| 2012/0110071 A1 | 5/2012 | Zhou et al. |
| 2012/0136959 A1 | 5/2012 | Kadam et al. |
| 2012/0143965 A1 | 6/2012 | Parker et al. |
| 2012/0166367 A1 | 6/2012 | Murdock et al. |
| 2012/0215645 A1 | 8/2012 | Chung et al. |
| 2012/0221406 A1 | 8/2012 | Kruhoeffer et al. |
| 2012/0317198 A1 | 12/2012 | Patton et al. |
| 2013/0024465 A1 | 1/2013 | Schiff et al. |
| 2013/0080222 A1 | 3/2013 | Quinn |
| 2013/0103637 A1 | 4/2013 | Dror et al. |
| 2013/0190004 A1 | 7/2013 | Papakipos et al. |
| 2014/0040171 A1 | 2/2014 | Segalov et al. |
| 2014/0099610 A1 | 4/2014 | Bak et al. |
| 2014/0136185 A1 | 5/2014 | Bhatt |

FOREIGN PATENT DOCUMENTS

| | | |
|---|---|---|
| KR | 20090068803 | 6/2009 |
| KR | 20090080822 | 7/2009 |

* cited by examiner

SYSTEM AND METHODS THEREOF FOR REAL-TIME MONITORING OF A SENTIMENT TREND WITH RESPECT OF A DESIRED PHRASE

CROSS-REFERENCE TO RELATED APPLICATIONS

This application is a continuation-in-part of U.S. patent application Ser. No. 13/214,588 filed on Aug. 22, 2011 which is a continuation-in-part of U.S. patent application Ser. No. 13/050,515, filed on Mar. 17, 2011 which claims the benefit of U.S. provisional application No. 61/316,844 filed on Mar. 24, 2010. The contents of the above-referenced applications are incorporated herein by reference.

TECHNICAL FIELD

The invention generally relates to the generation of taxonomies based on information available on the Internet, and more specifically to the generation of taxonomies with respect to a plurality of terms, particularly social terms, and respective sentiments thereto, and generating real-time notifications responsive to trends.

BACKGROUND OF THE INVENTION

There is an abundance of information available on the Internet as user generated content, such as web pages, social networks, as well as other sources of information, which are accessible via the world-wide web (WWW). Search systems make the access to such information speedy and generally cost effective. However, there are certain disadvantages, one of which is the fact that even targeted searches to generally available information results in large amounts of 'hits' requiring the user to sift through a lot of information that is less than valuable. The search is static by nature and over time, as more and more irrelevant data is available, the more difficult it is to get to meaningful information.

Various users of information are concerned with a more elaborate analysis of the information available through the WWW and have interest also in the time-value of such information. That is, older information may be less interesting than newer information and the trends relating to the information may be more interesting than the data relating to the information at any given point in time. Current solutions monitor online behavior rather than attempting to reach intents. For example, today advertisers attempting to target customers can merely do so based on where the customers go, what they do and what they read on the web. For example, when a user reads about the difficulties of a car manufacturer, providing an advertisement for the purchase of a car is not necessarily the right type of advertisement. In other words, today's available solutions are unable to distinguish this case from an article where the same company presents a new model of a car. Likewise, the prior art solutions are unable to correlate items appearing in such sources of information to determine any kind of meaningful relationship.

An ability to understand human trends dynamically as they are expressed would be of significant advantage to advertisers, presenters, politicians, chief executive officers (CEOs) and others who may have a concern in such deeper understanding of the information. Tools addressing such issues are unavailable today.

It would therefore be advantageous to provide tools that would provide real-time information regarding trends of certain terms, and specifically, sentiment trends with respect of such terms.

SUMMARY OF THE INVENTION

Certain embodiments disclosed herein include a system for real-time monitoring of changes in a sentiment respective of an input non-sentiment phrase. The system comprises a data storage for storing a plurality of phrases including sentiment phrases and non-sentiment phrases and a plurality of term taxonomies, wherein at least one of the stored term taxonomies includes the input non-sentiment phrase; an analysis unit for at least computing sentiment trends; an interface for receiving the input non-sentiment phrase and at least one tendency parameter respective of the input non-sentiment phrase; a monitor for querying the analysis unit to compute a sentiment trend for the at least one term taxonomy, the monitor is further adapted to determine in real-time changes in a direction of the computed sentiment trend with respect to the at least one input tendency parameter; and an output unit for generating at least a notification responsive to determination that the change in the direction of the sentiment trend with respect to the at least one input tendency parameter has occurred.

Certain embodiments disclosed herein also include a method for real-time monitoring of changes in a sentiment respective of an input non-sentiment phrase. The method comprises receiving the input non-sentiment phrase and at least one tendency parameter respective of the input non-sentiment phrase; identifying in a data storage at least one of a term taxonomy that includes the input non-sentiment phrase, wherein the data storage contains a plurality of phrases including sentiment phrases, non-sentiment phrases, and a plurality of term taxonomies; computing a sentiment trend for the at least one term taxonomy; monitoring the sentiment trend to detect real-time changes in a direction of the sentiment trend with respect to the at least one tendency parameter; and generating at least a notification when a change in the direction of the sentiment trend with respect to the input tendency parameter has occurred.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments of the invention for real-time monitoring of change in the sentiment trend with respect to phrases based on term taxonomies of user generated content are provided. In addition, the disclosed embodiments allow for generation of real-time notifications with respect to the monitoring. Such notifications enable a user (e.g., an advertiser) to detect in real-time when a non-sentiment phrase receives an increase in unfavorable mentions, i.e., sentiment phrase(s), pointing out the source of the trend and its characteristics. This enables the user to address the issue and potentially correct or dampen the effect. Conversely, if a favorable mention is detected, such real-time monitoring and notification may allow an advertiser to either increase or decrease expenditure on an advertisement to use funds more effectively.

For example, if the brand is mentioned in an increasing rate in the phrase, for example, "brand XYZ is bad for your health" the disclosed solution detects it in real-time and provides a notification to the user of the system. In turn this allows the user to respond quickly. Alternatively, when a brand is favorably mentioned at an increasing rate, for example in the phrase "brand XYZ is great with meat" the system provides a notification to the user who can respond with an action to this regard.

Figure 1:
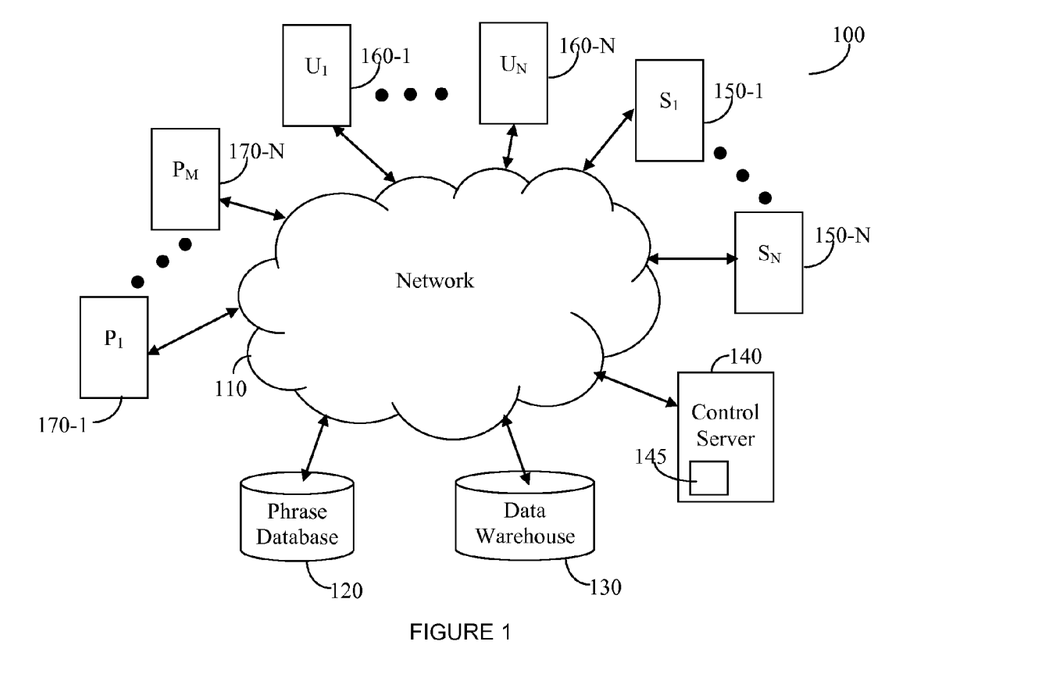
FIG. 1 is a schematic diagram of a system for creation of term taxonomies and analyzing sentiment trends by mining web based user generated content.

FIG. 1 depicts an exemplary and non-limiting schematic diagram of a system 100 for creation of term taxonomies analyzing sentiment trends. To a network 110 there are connected various components that comprise the system. The network 110 can be a local area network (LAN), a wide area network (WAN), a metro area network (MAN), the world wide web (WWW), the Internet, the likes, and combinations thereof.

A phrase database 120 is connected to the network 110 and contains identified phrases that are either preloaded to the database 120 or, phrases that were detected during operation of the system as such phrases, and as further explained in greater detail herein below. Phrases may contain, but are not limited to terms of interest, brand names, and the like. A data warehouse 130 is also connected to the network 110, for storing processed information respective of phrases and as further explained in greater detail herein below. The operation of the system 100 is controlled by a control server 140 having code stored in memory 145, such that the control server 140 may perform the tasks discussed in more detail herein below.

The processing may be performed using solely the control server 140. Alternatively or collectively the system 100 may include one or more processing units 170-1 through 170-N which allow for handling of the vast amount of information needed to be worked on. Also connected to the network 110 are one or more sources of web-based user-generated content 150-1 through 150-N (collectively referred to as information sources 150). The information sources 150 include, but are not limited to social networks, web pages, and news feeds. These may include, but are not limited to, social networks, e.g., Facebook®, Twitter™, Google+™ web pages, blogs, and other sources of textual information. Typically a plurality of users using user nodes 160-1 through 160-N (collectively referred to as user nodes 160) access the information sources 150 periodically and provide their own comments and information therein. As described in further detail with respect of FIG. 2 these types and pieces of information are processed by the system 100.

Figure 2:
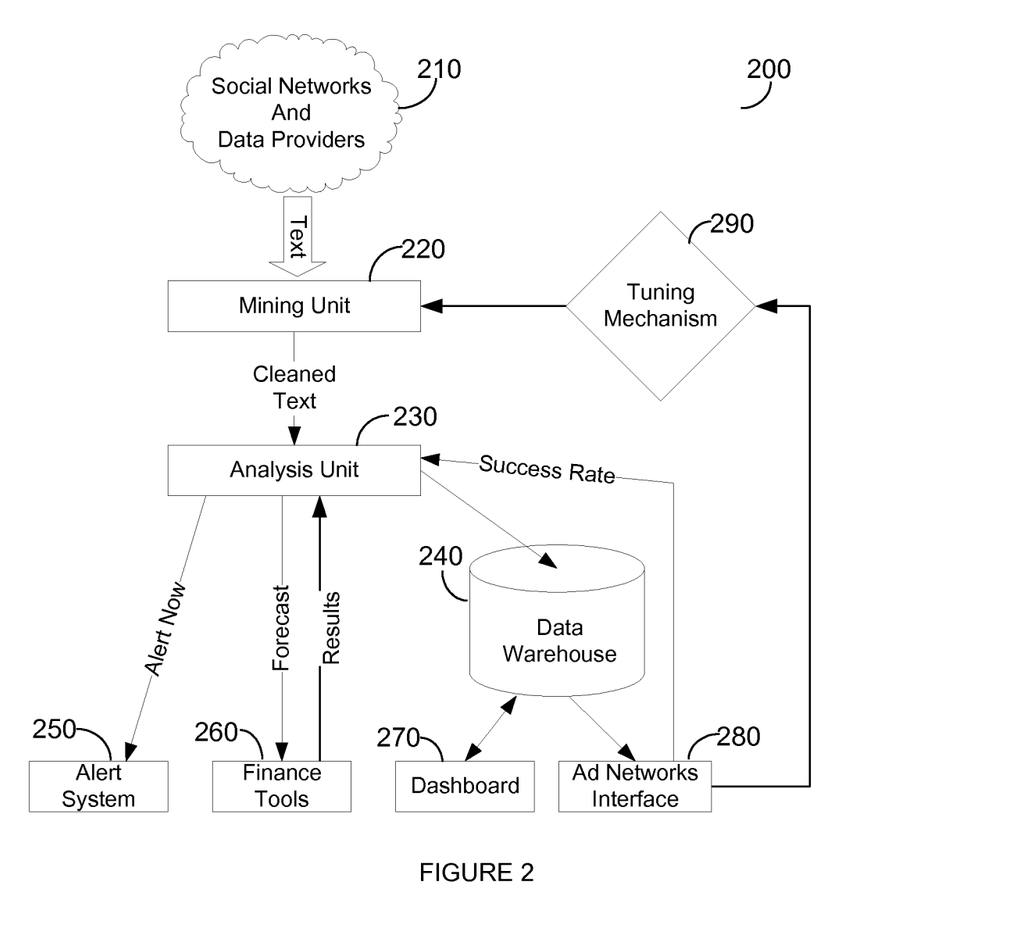
FIG. 2 is an overview block diagram of the operation of the system depicted in FIG. 1.

FIG. 2 shows an exemplary and non-limiting overview block diagram 200 of the operation of the system 100. One or more data sources 210 including, but not limited to, social networks and other user provided sources are checked and or regularly supplied for text to be provided to a mining unit 220 that performs a mining process. The access to the data sources 210 is through the network 110 by means of a network interface (not shown).

The task of the mining process is to extract from the text all irrelevant data that cannot be effectively used in the analysis that is performed by the system 100. Basically, this mining task is to identify sentiment phrases and non-sentiment phrases. In addition to sentiment extraction, the mining process "cleans" the collected data. Sentiment phrases may include, but not by way of limitation, words such as "love", "hate", "great", "disaster", "beautiful", "ugly" and the like, but also "not good", "great time", "awfully good", and more. Cleaning of data may comprise phrases common in social networks such as, but not limited to, conversion of "GRREEEAT!" into "great", and so on. In addition, the cleaning may include removing conjunctions and words that appear in an extremely high frequency or are otherwise unknown or irrelevant. While single words have been shown here, multiple words grouped as a phrase may also be treated as a sentiment phrase, such as but not by way of limitation "great experience", "major issues", "looks great" and more. These words describe a sentiment typically applied to a non-sentiment phrase.

The text coming in from the source(s) 210 is mined for such phrases, for example, by using a reference for phrases stored in a database, such as phrase database 120. The mining process includes understanding that the complex phrase of "I hate I love Lucy" actually comprises a sentiment phrase "hate" and a non-sentiment phrase "I love Lucy", where the word "love" in the non-sentiment phrase is not to be analyzed as a standalone phrase having a sentiment. Furthermore, the sentence "I saw the movie I love Lucy" does not comprise any sentiment phrase, and therefore would not cause the mining unit 220 using the mining process to associate a sentiment phrase to the non-sentiment phrase.

The phrases database 120, in certain implementations, is a preloaded database and is updated periodically. However, it is also possible to automatically update the phrase database 120 upon detection of a phrase as being either one of a sentiment phrase or a non-sentiment phrase. Furthermore, a sentiment phrase within a non-sentiment phrase is ignored for this purpose as being a sentiment phrase and is only treated as part of the non-sentiment phrase. It should therefore be understood that a taxonomy is created by association of a non-sentiment phrase with a sentiment phrase. Hence, for example, in the context of the phrase "I hate the movie I Love Lucy" the sentiment phrase is "hate", the non-sentiment phrase is "I Love Lucy" and the phrases are associated together to create a taxonomy.

In addition, a comparative numerical value is associated with each sentiment. For example the phrase "love" may have a score of "+10", the phrase "indifferent" the score of "0" and the phrase "hate" the score of "−10". Hence positive sentiments would result with a positive score while negative sentiments would result in a negative score. Such score association may be performed initially manually, but over time the system 100, based on feedback can position the sentiment phrases relative to each other to determine an ever changing score value to every sentiment phrase. This is of high importance as language references change over time and references which may be highly positive can become negative or vice versa, or just decline or incline as the case may be.

In one embodiment, a weighted sentiment score corresponding to a plurality of sentiment phrases collected for a respective non-sentiment phrase is generated. That is, within a specific context, the plurality of sentiments associated with a non-sentiment phrase are collected and an aggregated score is generated. Such a score may be further weighted to reflect the weight of each of the individual scores with respect to other scores.

The cleaned text that contains the phrases is now operated upon using an analysis process performed by an analysis unit 230 of the system 200. The analysis may provide based on the type of process information needed, the likes of alerts and financial information. An alert may be sounded by the alert system 250 if it is determined that a certain non-sentiment phrase, for example, a certain brand name, is increasingly associated with negative sentiment phrases. This may be of high importance as the manufacturer associated with the brand name would presumably wish to act upon such negative information as soon as possible in real-time. Likewise, a positive sentiment association may be of interest for either supporting that sentiment by certain advertising campaigns to further strengthen the brand name, or otherwise providing certain incentives to consumers of products of the brand name.

In one embodiment, the analysis unit performs the analysis process that uses the associations of non-sentiment and sentiment phrases to periodically generate at least a statistical analysis on the associations of phrases. As will be described in detail below with reference to FIGS. 5-7, by performing the statistical analysis the sentiment of different term taxonomies over time can be determined, that is, the trend of a sentiment phrase with respect of a non-sentiment phrase can be identified. In addition, the statistical analysis can determine the frequency of the same term taxonomy appearing in two different web-based data sources, e.g., social networks. As will be further discussed below, a plurality of reports and/or alerts can be generated responsive of the results of the statistical analysis.

Returning to FIG. 2, the analyzed data is stored in a data warehouse 240, shown also as data warehouse 130 in FIG. 1. Through a dashboard utility 270 it is possible to provide queries to the data warehouse 240. An advertisement (Ad or ad) network interface 280 further enables advertisement related management, for example providing advertisements relative to specific phrases used. In addition, the information is tuned by a tuning mechanism 290 therefore allowing for feedback to enable better mining of the data by the mining unit 220. In the case of advertisements a success rate, for example conversion rates, is also provided to the analysis unit 230 that performs an analysis process for better analysis of the cleaned text by creating real-time taxonomies.

An analysis process, performed by the analysis unit 230, may further include grouping and classification of terms in real-time, as they are collected by the system. Furthermore, current trends can be analyzed and information thereof provided, including, without limitation, an inclining trend and a declining trend with respect to the sentiment phrase associated with a non-sentiment phrase. Moreover, using the analysis tools it is possible to detect hidden connections, i.e., an association between non-sentiment phrases that have a correlation. For example, if a web site of a talk show refers more positively or more frequently to a brand name product, then the system through its phrase analysis can detect the correlation between the non-sentiment phrases and then compare the sentiment phrases thereof. That way, if the talk show web site tends to favor and recommend the brand name product it would make more sense to spend, for example, advertisement money there, than if the sentiment phrase would be a negative one.

Figure 3:
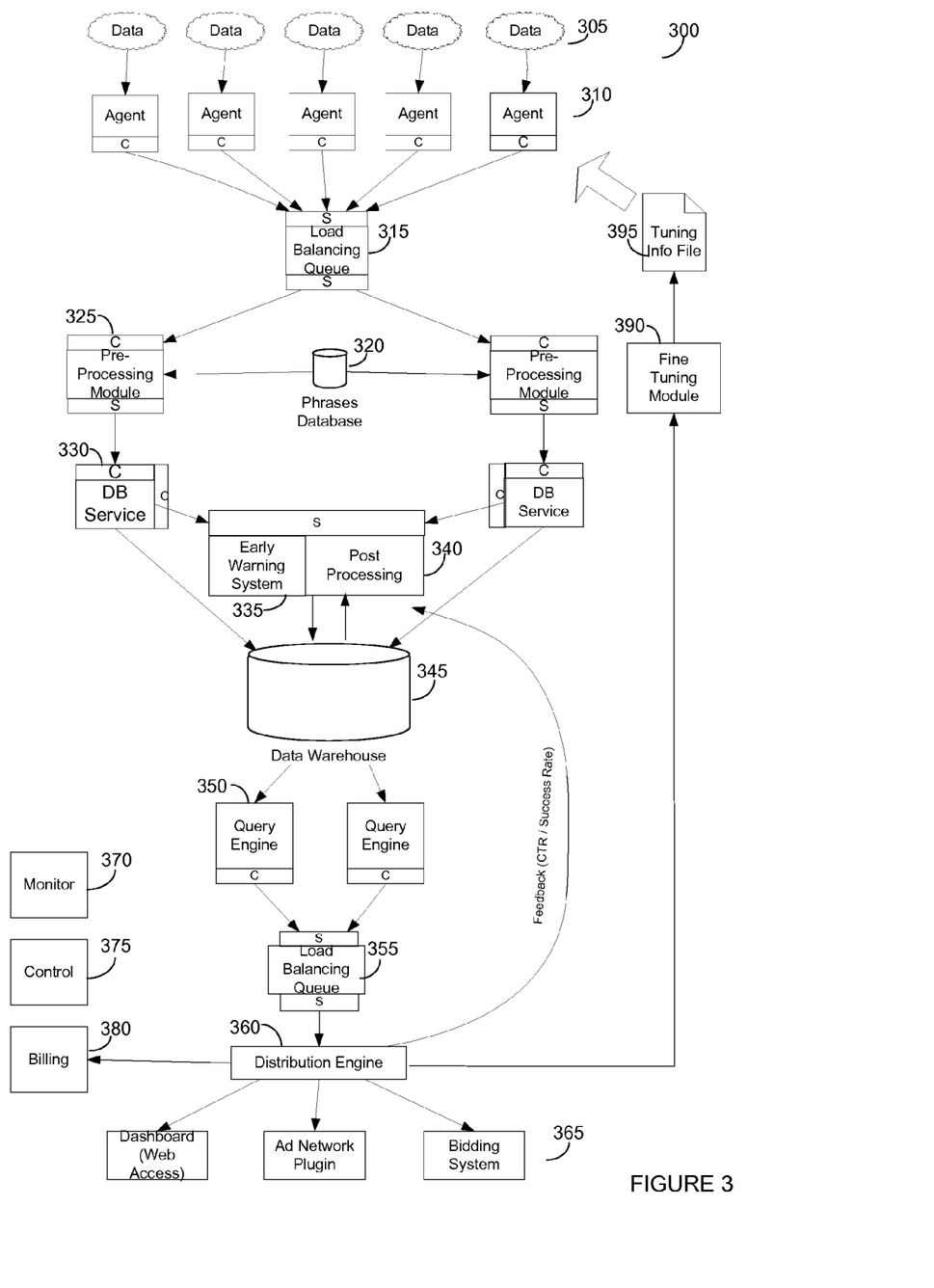
FIG. 3 is a detailed block diagram of the operation of the system depicted in FIGS. 1 and 2.

FIG. 3 shows an exemplary and non-limiting detailed block diagram of the operation of a system 300. Data sources 305, including for example Facebook® and Twitter™, are either probed periodically (pull) by agents 310 of the system 300, or received periodically therefrom (push). Such agents may be operative on the control server 140 or on any one of the processing units 170, when applicable. An optional load balancing queue 315, operative for example on the control server 140, balances the loads of the agents on the execution units such that their operation does not overload any such unit. In the exemplary and non-limiting implementation two processing paths are shown, however, more may be used as may be necessary.

In one embodiment, the loading of an agent 310 is also a function of the periodic checking of the respective data source 305. Each processing unit, for example, processing units 170, performs a preprocessing using the preprocessing module 325. The preprocessing, which is the mining of phrases as explained hereinabove, is performed respective of a phrases database 320 to which such processing units 170 are connected to by means of the network 110. A database service utility 330, executing on each processing node 170, stores the phrases in the data warehouse 345, shown in FIG. 1 as data warehouse 130. An early warning system 335, implemented on one of the processing units 170 or on the control server 140, is communicatively connected with the database service utility 330, and configured to generate early warning based on specific analysis. For example, increase of references to a brand name product above a threshold value may result in an alarm. In one embodiment, this happens only when the source of such a rise is a specific source of interest. This is performed because some data sources 305 are more meaningful for certain non-sentiment phrases than others, and furthermore, some sentiment phrases are more critical when appearing in one source 305 versus another.

The second portion of the system 300 depicted in FIG. 3, concerns the ability to query the data warehouse 345 by one or more query engines 350, using an optional load balancing queue 355 as may be applicable. The queries may be received from a plurality of sources 365 including, but not limited to, a dashboard for web access, an advertisement network plugin, and a bidding system. The sources 365 are connected to a distribution engine 360 that receives the queries and submits them to the optional load balancing queue 355 as well as distributing the answers received thereto. The distribution engine 360 further provides information to a fine tuning module 390, executed, for example, on the control server 140. The information is provided, for example using a tuning information file 395. Other subsystems such as a monitor 370 for monitoring the operation of the system 300, a control 375 and a billing system 380 may all be used in conjunction with the operation of system 300.

Figure 4:
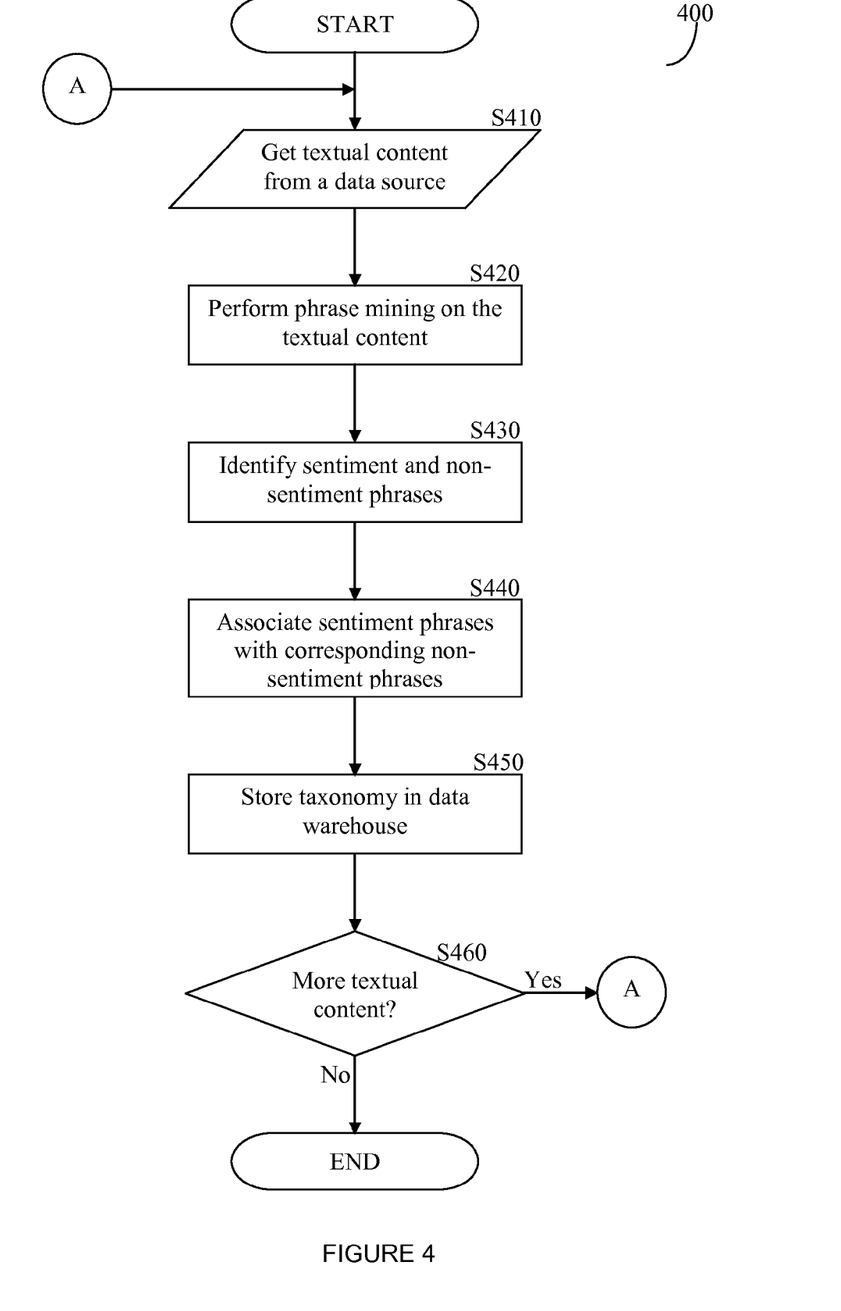
FIG. 4 is a flowchart creation of term taxonomies by mining web based user generated content.

FIG. 4 depicts an exemplary and non-limiting flowchart 400 describing the method for creation of term taxonomies. In S410 the system, for example and without limitations, any one of the systems 100, 200 and 300 described hereinabove, receives textual content from a source of information. As shown above, this can be performed by using agents 310. In S420, a phrase mining process is performed. As discussed hereinabove, the phrase mining includes at least the detection of phrases and in S430 identification and separation of sentiment and non-sentiment phrases. In S440, sentiment phrases are associated with non-sentiment phrases as may be applicable.

In S450, the taxonomies are created by association of non-sentiment phrases to respective sentiment phrases, including but not limited to, aggregation of sentiment phrases with respect to a non-sentiment phrase and vice versa. The created taxonomies are then stored in a data warehouse (e.g., the data warehouse 130 shown in FIG. 1). This enables the use of the data in the data warehouse by queries as also discussed in more detail hereinabove. In S460 it is checked whether additional text content is to be gathered, and if so execution returns to S410; otherwise, execution terminates. It should be noted that an analysis takes place to determine the likes of current trends respective of the non-sentiment phrases based on their sentiment phrases, prediction of future trends, identification of hidden connections and the like.

Figure 5:
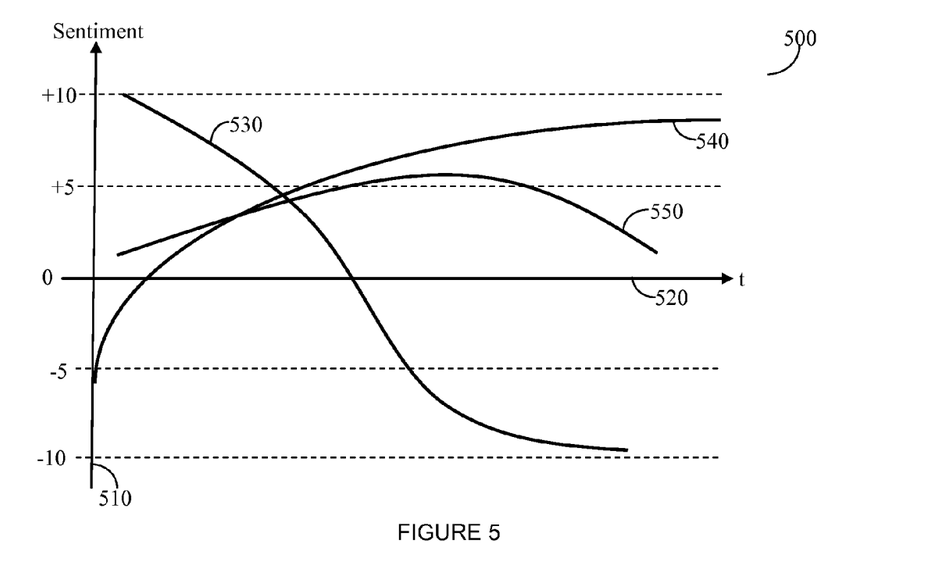
FIG. 5 is a sentiment chart over time for three different terms generated according to an embodiment of the invention.

Once term taxonomies have been collected in accordance with the teachings discussed herein, it is also possible to perform a variety of trend analyses based on the collected information. Referring now to FIG. 5 there is shown an exemplary and non-limiting sentiment chart 500 generated according to an embodiment of the invention.

The chart 500 depicts the sentiment curves 530, 540 and 550 of three different terms over time. The horizontal axis 520 of the chart 500 represents time and the vertical axis 510 represents a sentiment value. In this particular example the range of the sentiment is from +10 to −10 where +10 represents a strong positive sentiment, and −10 represents a strong negative sentiment, as further described hereinabove.

Curve 530, which relates to the sentiment of a first term, declines over time. While it began with a very high positive sentiment it has declined steadily and at times rapidly over time. The curve 530 is created by continuous collection of sentiments from web-based user generated content, for example, a social network monitored by the systems 100, 200 and 300 described hereinabove in more detail. In one embodiment of the invention, the generation of an alert may be requested as a result of a decline of a sentiment below a desirable value, or, if the decline rate is faster than a predefined threshold.

The curve 540 describes a steadily increasing sentiment trend for the monitored term. It may be requested that such terms be correlated over time as these terms may behave inversely to each other and therefore a change in one may be of importance to the other. For example, if a sentiment to a product A decreases, the clients may be shifting to a product B for which the sentiment is increasing, and vice versa. The analysis and reporting is of high importance as it may allow a campaign manager to allocate resources to handle each situation. Moreover, it should be noted that in accordance to one embodiment of the invention, the search for correlation is performed automatically by the system in order to identify such high correlation, either negative or positive, between various terms and their respective taxonomies.

The chart 500 shows yet another curve, curve 550 which initially inclines and then declines. It would be appreciated by one of ordinary skill that a first derivative analysis of this curve 550 would reveal this trend towards reaching a peak in time and then the decline. Again, the importance of such information is with respect to the ability to act in response to such data. Moreover, as data is collected from a plurality of data sources, such as social networks, it is further possible to identify if the trend is unique to a certain social network, or otherwise spread between the different networks.

In an embodiment of the invention, the trends, examples of which are shown in the chart 500, may be weighted data, such that the data from one social network may have a higher weight than the data reaching from another social network. The importance of one social network over another may be evaluated based on various parameters and may be fixed or dynamic.

Figure 6:
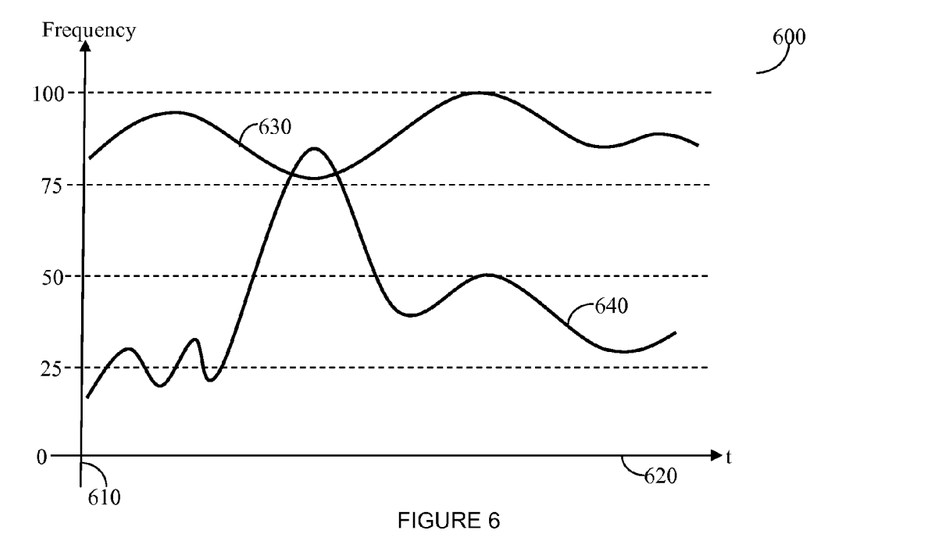
FIG. 6 is a frequency chart over time for the same taxonomy term in two different social networks according an embodiment of the invention.

FIG. 6 shows an exemplary and non-limiting chart 600 provided with respect to the frequency of the same taxonomy term appearing in two different data sources, e.g., social networks. The horizontal axis 620 represents time and the vertical axis 610 represents a frequency of occurrence which may be relative or absolute. There are two curves 630 and 640 which generally behave differently. In one point in time, the curve 640 has frequency values that are above the frequency of curve 630. However, as can be readily observed, this is almost a transient and generally the frequency for the second social network, represented by the curve 640, is much lower. In such a case one may use an average over time and a weighting system that is based on the average or median frequency of each of the curves, where the average or median of curve 630 is certainly much higher than the average or median of curve 640. The period of averaging may vary depending on system parameters and general behavior and provide a damping factor to the transient occurrence shown in chart 600. It should be appreciated that other statistical analysis is possible without departing from the spirit of the invention.

It should be noted that in accordance with an embodiment of the invention alerts may be set so that a notification is set respective of the frequency of mentioning of a term. This may be in a declining or an inclining in mentioning frequency. Furthermore, an alert may be generated when a declining trend or inclining trend has shifted towards the opposite trend. This can be further tied with the sentiment analysis described hereinabove providing additional tools for real-time response by, for example, a campaign manager. In one embodiment of the invention, the system displays charts such as chart 500 and chart 600, preferably in real-time, on a display of a user using the disclosed system.

Figure 7:
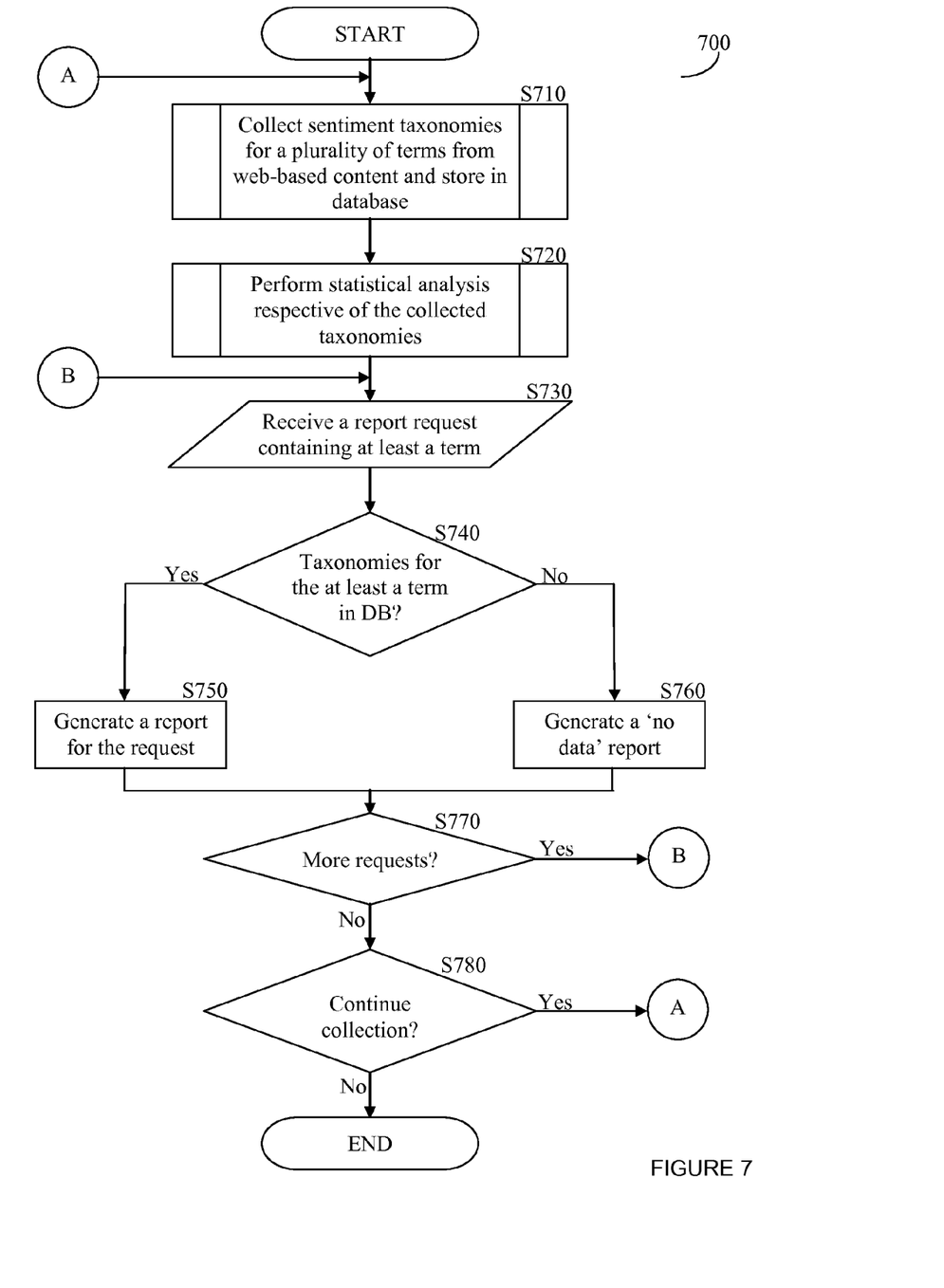
FIG. 7 is a flowchart describing a method for trend analysis according to certain embodiments of the invention.

FIG. 7 shows an exemplary and non-liming flowchart 700 of trend analysis according to an embodiment of the invention. In S710 collection of sentiment taxonomies takes place for a plurality of terms from web-based data sources, such as social networks and storing the identified taxonomies in a database. Such a process was described hereinabove with respect of FIGS. 1 through 4.

In S720, statistical analysis on the collected taxonomies is performed. The statistical analysis includes, but is not limited to, correlation between term taxonomies, frequency analysis, and so on and so forth. Several examples have been discussed hereinabove.

In accordance with an embodiment of the invention, the statistical analysis includes a correlation analysis between at least two non-sentiment phrases that is performed to determine their correlation respective of their respective sentiment phrases. For example, consider the case of the movie "I Love Lucy" having only the sentiment-phrase "Love" associated therewith. It would be then determined that there is a high correlation, "1" between the non-sentiment phrase "I Love Lucy" and the sentiment phrase "Love" and with it being a positive term a score of "+10" would be provided. Conversely, if only the sentiment-phrase "Hate" would be associated with "I Love Lucy" then while the correlation would also be "1" the fact that it is a negative sentiment phrase would cause the score to be "−10". If there would be an equal number of "Love" and "Hate" sentiment phrases associated with the non-sentiment phrase "I Love Lucy" then the score would be "0" as the overall sentiment is indifferent for the entire group of responders, even though there would be two distinct groups that could be handled separately.

In accordance with another embodiment of the invention, the statistical analysis includes a dynamic weighting of trends from different data sources based on one or more of the following: a frequency at each time interval and frequency over a plurality of time intervals to offset transients in trends. For example, one may consider two different sources of data, Facebook and Twitter, each providing sentiment phrases to the same non-sentiment phrases. With the different nature of use of each of these data sources it may be necessary to provide a weight to adjust for the characteristics of each of them. For example, Twitter being a relatively fast responder to trends may show a significant change over a baseline even though the numbers are quite small, and hence would require a weighting that would emphasis its early reaction. Such phrases may also fade quickly from Twitter, but still linger on for a much longer time in Facebook requiring it now to have a higher weight on that data source. Thus, the weighting itself between the two data sources may change over time with respect to a taxonomy.

In S730, there is received by the system a request for a report. The request may consist of one or more terms with requests for specific report items, such as correlation between two terms, or a request to show the strongest correlation between a given term and another term, or even a negative strong correlation between a given term and another term, and so on and so forth.

In S740, it is checked whether the requested term taxonomies are available. For example, it is checked if the requested taxonomies are stored in the database of the system (e.g., a data warehouse 130, 240 or 345). If S740 results with a "No" answer, execution continues with S760; otherwise, execution continues with S750 by generating the requested report and followed by S770. In S760, there is generated a 'no data' report, i.e., because due to the lack of a taxonomy of a requested term, the system cannot generate a requested report. In S770 it is checked whether additional requests are pending, and if so, execution returns to S730; otherwise, execution continues with S780. In S780, another check is made whether it is necessary to continue with the collection of data from the web-based data sources, and if so execution continues with S710; otherwise, execution terminates.

Figure 8:
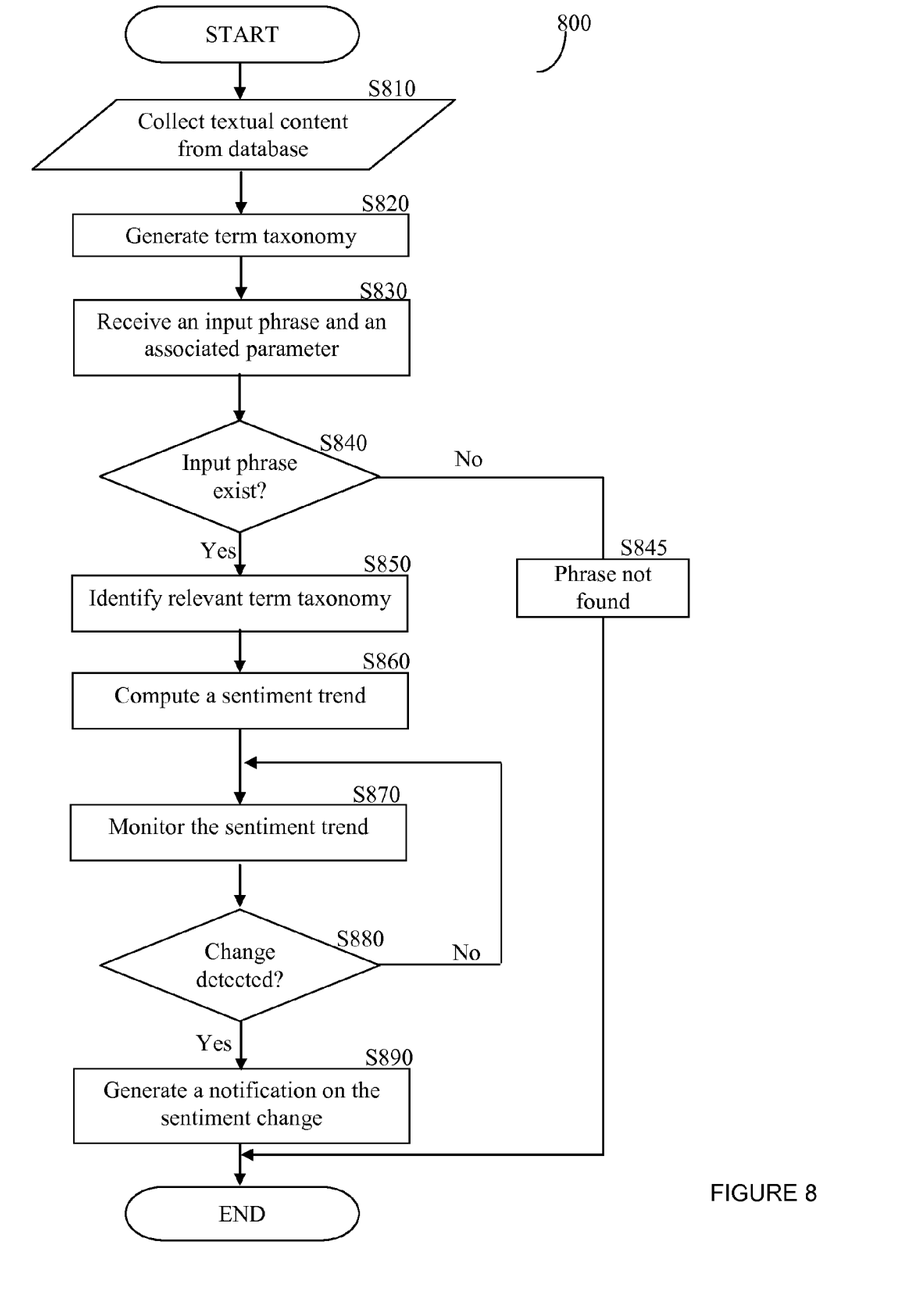
FIG. 8 is a flowchart describing a method for real-time monitoring of notification generation on changes in a sentiment respective of an input phrase according to certain embodiments of the invention.

FIG. 8 shows an exemplary and non-liming flowchart 800 for real-time monitoring and notification generation on changes in a sentiment respective of a phrase according to an embodiment of the invention. The notification enables a user, and more specifically advertisers or campaign managers placing advertisements, to act appropriately in response to such sentiment change. The method can be performed by the system, for example and without limitations, any one of the systems 100, 200 and 300 described hereinabove.

In S810, collection of textual content from at least one data source, such as a social network, a blog, and a news feed, is made, to identify sentiment and non-sentiment phrases. In S820, term taxonomies are generated between the plurality of sentiment and non-sentiment phrases, and then the identified term taxonomies are stored in a database. As mentioned above, a term taxonomy is an association of non-sentiment phrase with a sentiment phrase. The process for creating term taxonomies was described hereinabove with respect of FIGS. 1 through 4.

In S830, an input non-sentiment phrase and an at least one tendency parameter are received, a tendency parameter providing an indication of a desired trend for a non-sentiment phrase. In an embodiment of the invention, a tendency parameter defines the sentiment and general direction in which sentiment trends should be monitored. For example, it may be desirable to check if a favorable sentiment decreases, an unfavorable sentiment decreases, a favorable sentiment increases, and so on. In an embodiment of the invention, the input non-sentiment phrase and at least one tendency parameter are provided as an input to the system by a user, e.g., an advertiser or a campaign manager.

In S840, it is checked whether the received non-sentiment phrase exists in the database, and if so execution continues with S850; otherwise, a notification is provided in S845 to inform the user that no match was found.

In S850, the database is searched to identify at least one term taxonomy that includes the received non-sentiment phrase and a sentiment phrase respective of the tendency parameter. For example, if the non-sentiment phrase is a brand name "XYZ" and the tendency parameter is for unfavorable sentiment, then taxonomies, such as "XYZ is bad to the public" or "XYZ has the worst customer services" will be identified, where "bad" and "worst" are merely examples for sentiment phrases respective of an unfavorable sentiment tendency parameter.

In S860, a sentiment trend is computed for each of the term taxonomies identified at S850. As discussed above with reference to FIG. 5-7, the sentiment of different term taxonomies over time can be determined by performing the statistical analysis. In S870, each of the computed sentiment trends is monitored to detect changes in the direction of the trend with respect to the input tendency parameter. For example, if the parameter defines for a decrease in the favorable sentiment, then change for a positive sentiment value to a negative sentiment would be considered as a change in the sentiment tendency.

At S880, a check is made to determine if a change in the sentiment tendency has been detected and a notification is warranted. If so, in S890, a notification is generated with respect of the non-sentiment phrase; otherwise execution returns to S870. The notification may specify the non-sentiment phrase being monitored, the nature of the change, the time, and other statistical information that the user may request. In an embodiment of the invention, the notification can be provided as a message, an e-mail, a report, a short message system (SMS) or a multi-media message (MMS), and the like.

It should be apparent to one of ordinarily skill that based on the above discussion, the sentiment changes respective of different tendency parameters and multiple non-sentiment phrases can be monitored simultaneously.

Figure 9:
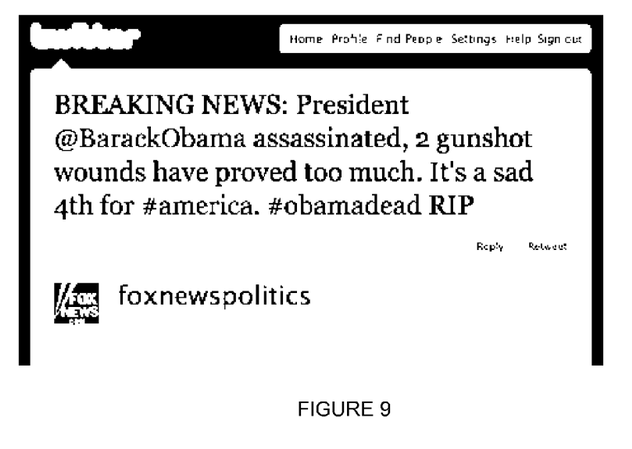
FIG. 9 is a screenshot of a tweet from the Twitter account of Fox News.
Figure 10:
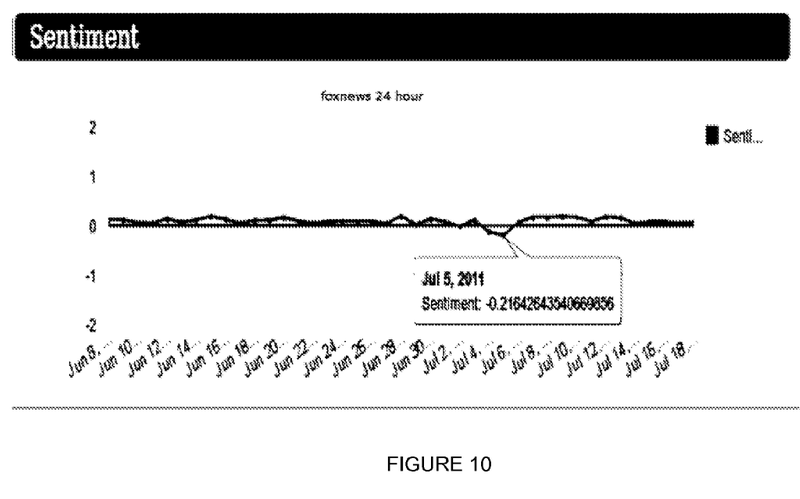
FIG. 10 is a screenshot depicting the sentiment towards the non-sentiment phrase "Fox News" respective of the tweet of FIG. 9.

To demonstrate the capabilities of the solution for real-time monitoring and notification generation on changes in a sentiment, several actual and non-limiting examples are provided. In the first example Fox News' Twitter account twitted on Jul. 5, 2011, a news item that claimed that the President was fatally shot. Such a tweet from a screen is shown in FIG. 9. Apparently, the Twitter account was hacked and this false item was maliciously placed. A sentiment analysis, shown on a screenshot in FIG. 10, for the non-sentiment phrase "Fox News" monitored according to the embodiments of the invention, shows that a real-time change in sentiment towards the non-sentiment phrase "Fox News" was detected. The change shows a dramatic decline from a positive sentiment to a negative sentiment. It actually also showed a bounce back in the following days and then a return to normal.

Figure 11:
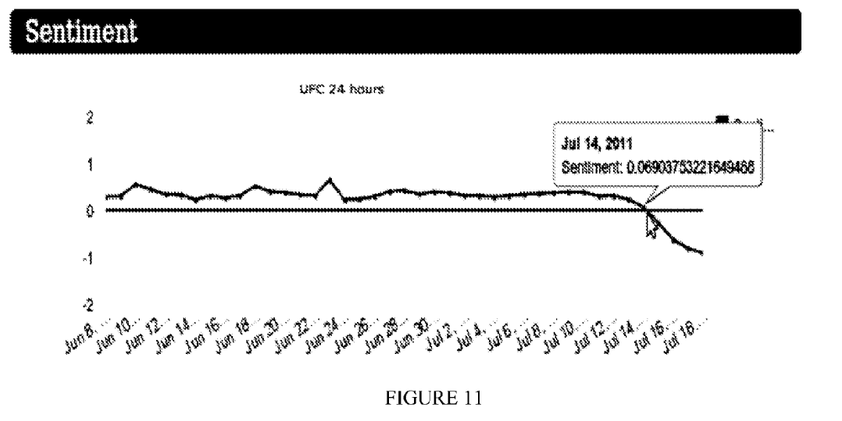
FIG. 11 is a screenshot depicting the sentiment towards the non-sentiment phrase "UFC".

FIG. 11 shows yet another exemplary and non-limiting screenshot of a sentiment change with respect to the non-sentiment phrase "UFC". Apparently from about Jul. 13, 2011, there was a significant change in sentiment towards the non-sentiment phrase "UFC" that fell from a positive value to a significant negative sentiment value as a result of what was described as the most "horrible fight ever banned from TV" and calling for people to actually watch this on "UFC banned TV". A significant negative sentiment quickly developed with respect of the phrase "UFC" that seemed to be staying on for at least the next few days.

Figure 12:
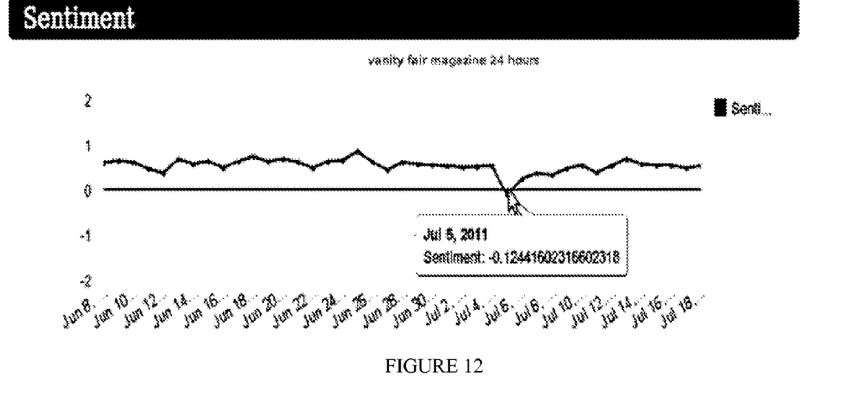
FIG. 12 is a screenshot depicting the sentiment towards the non-sentiment phrase "Vanity Fair Magazine".

In yet another exemplary and non-limiting sentiment screenshot shown in FIG. 12, the non-sentiment phrase "Vanity Fair Magazine" showed a drop in its generally positive sentiment when a new issue of the magazine published with the performer Justin Bieber on the magazine's cover. The cover, being considered the "worst cover with Justin Bieber" caused a drop in the rather favorable sentiment to the non-sentiment phrase "Vanity Fair Magazine", in fact developing a slightly negative sentiment. This change in that sentiment, detected in real-time, is of high value as it allows taking appropriate corrective actions.

It should be noted that while the examples shown hereinabove represent decline in sentiment, the system and the monitoring and notification methods discussed herein, are equally capable of detecting an incline in sentiment, as well as rates thereof. A slower rate of change may be acted on differently than a rapid rate of change, both of which are of high importance to placement of advertisements and their respective placement value. However, this should not be viewed as limiting the scope of the invention and it can be equally used also in other areas that would be apparent to those of ordinary skill in the art.

It should be further noted that the system discussed herein may allow the gathering of the sentiment with respect to a plurality of terms to generate a single understanding of a decline or incline in sentiment. For example, a company may use its brand name and one or more of its products to determine whether the sentiment is inclining or declining.

Once such parameters are determined, a course of action may be taken. In one embodiment, responsive to a report the system may recommend and/or execute the increase or decrease of expenditure on advertisements to offset an observed trend. That is, if it is seen that there is a declining sentiment the system may authorize or otherwise automatically increase the amounts spent on advertisements. In today's environment of increasing expenditure on multiple on-line channels, such an automatic real-time response to a real-time incline or decline in sentiment is essential for effective and efficient use of given budgets.

The various embodiments disclosed herein may be implemented as hardware, firmware, software, or any combination thereof. Moreover, the software is preferably implemented as an application program tangibly embodied on a program storage unit or non-transitory computer readable medium consisting of parts, or of certain devices and/or a combination of devices. A non-transitory computer readable medium is any computer readable medium except for a transitory propagating signal. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system for real-time monitoring of changes in a sentiment with respect to an input non-sentiment phrase, comprising:
    a data warehouse storage for storing a plurality of phrases including sentiment phrases, non-sentiment phrases and a plurality of term taxonomies, wherein each of the stored term taxonomies is an association of a non-sentiment phrase with a sentiment phrase, wherein at least one of the stored term taxonomies includes the input non-sentiment phrase;
    an analysis unit for at least computing sentiment trends for the at least one of the stored term taxonomies including the input non-sentiment phrase;
    an interface for receiving the input non-sentiment phrase and at least one tendency parameter of the input non-sentiment phrase;
    a monitor for querying the analysis unit to compute a sentiment trend for the at least one of the stored term taxonomies, wherein the monitor is further configured to determine, in real-time, changes in a direction of the computed sentiment trend with respect to the at least one input tendency parameter; and an output unit for generating at least a notification responsive to determination that the change in the direction of the computed sentiment trend with respect to the at least one input tendency parameter has occurred, wherein the notification is generated in real-time as the change in the direction of the sentiment trend has occurred.

2. The system of claim 1, further comprising:

a network interface that enables access to at least one data source; and a mining unit for collecting textual content from the at least one data source, generating the plurality of phrases from the textual content, and storing the generated plurality of phrases in the data storage.

3. The system of claim 1, wherein the analysis unit is further configured to create, in real-time, the plurality of term taxonomies based on the non-sentiment phrases and the sentiment phrases.

4. The system of claim 1, wherein the at least one of the stored term taxonomies that includes the input non-sentiment phrase is an association between the input non-sentiment phrase and at least one sentiment phrase that is related to the at least one tendency parameter.

5. The system of claim 1, wherein the at least one tendency parameter defines the sentiment and a direction in which the computed sentiment trend should be monitored.

6. The system of claim 5, wherein the real-time changes in the direction of the sentiment trend include a change from a positive sentiment to a negative sentiment and a change from a negative sentiment to a positive sentiment.

7. The system of claim 5, wherein the real-time changes in the direction of the sentiment trend further include the sentiment increasingly becoming unfavorable with respect to at least a previous determination of the sentiment, and the sentiment increasingly becoming favorable with respect to at least a previous determination of the sentiment.

8. The system of claim 1, wherein the at least one data source is at least one of: a social network, a blog, a web page, and a news feed.

9. The system of claim 1, wherein the analysis unit is further configured to determine a rate of change in the sentiment trend.

10. The system of claim 1, wherein the notification is in a form of at least one of: a message, an e-mail, a report, a short message service (SMS) message, and a multi-media message (MMS).

11. A computer implemented method for real-time monitoring of changes in a sentiment with respect to an input non-sentiment phrase, comprising:

receiving the input non-sentiment phrase and at least one tendency parameter of the input non-sentiment phrase;

identifying, in a data warehouse storage, at least one term taxonomy that includes the input non-sentiment phrase, wherein the data storage contains a plurality of phrases including sentiment phrases, non-sentiment phrases, and a plurality of term taxonomies, wherein each of the term taxonomies in the data warehouse storage is an association of a non-sentiment phrase with a sentiment phrase, wherein at least one of the term taxonomies includes the input non-sentiment phrase;

computing, by a computer, a sentiment trend for the at least one of the term taxonomies including the input non-sentiment phrase;

monitoring the sentiment trend to detect real-time changes in a direction of the sentiment trend for the at least one of the term taxonomies including the input non-sentiment phrase with respect to the at least one tendency parameter; and generating at least a notification when a change in the direction of the sentiment trend with respect to the input tendency parameter has occurred, wherein the at least one notification is generated in real time as the change in the direction of the sentiment trend has occurred.

12. The method of claim 11, further comprising:

collecting textual content from at least one data source;

generating the plurality of phrases from the textual content; and storing the generated plurality of phrases in the data warehouse storage.

13. The method of claim 12, further comprising:

creating, in real-time, the plurality of term taxonomies based on the non-sentiment phrases and the sentiment phrases.

14. The method of claim 12, wherein the at least one data source is at least one of: a social network, a blog, a web page, and a news feed.

15. The method of claim 11, wherein the at least one of the term taxonomies that includes the input non-sentiment phrase is an association between the input non-sentiment phrase and at least one sentiment phrase that is related to the at least one tendency parameter.

16. The method of claim 11, wherein the at least one tendency parameter defines the sentiment and a direction in which the sentiment trend should be monitored.

17. The method of claim 16, wherein the real-time changes in the direction of the sentiment trend include a change from a positive sentiment to a negative sentiment and a change from a negative sentiment to a positive sentiment.

18. The method of claim 17, wherein the real-time changes in the direction of the sentiment trend further includes the sentiment increasingly becoming unfavorable with respect to at least a previous determination of the sentiment, and the sentiment increasingly becoming favorable with respect to at least a previous determination of the sentiment.

19. The method of claim 11, further comprising:

determining a rate of change in the sentiment trend.

20. The method of claim 11, wherein the notification is in a form of at least one of: a message, an e-mail, a report, a short message service (SMS) message, ands a multi-media message (MMS).

21. A non-transitory having stored thereon instructions for causing a processing circuitry to perform a process, the process comprising:

receiving an input non-sentiment phrase and at least one tendency parameter of the input non-sentiment phrase;

identifying, in a data warehouse storage, at least one term taxonomy that includes the input non-sentiment phrase, wherein the data storage contains a plurality of phrases including sentiment phrases, non-sentiment phrases, and a plurality of term taxonomies, wherein each of the term taxonomies in the data warehouse storage is an association of a non-sentiment phrase with a sentiment phrase, wherein at least one of the term taxonomies includes the input non-sentiment phrase;

computing, by a computer, a sentiment trend for the at least one of the term taxonomies including the input non-sentiment phrase;

monitoring the sentiment trend to detect real-time changes in a direction of the sentiment trend for the at least one of the term taxonomies including the input non-sentiment phrase with respect to the at least one tendency parameter; and generating at least a notification when a change in the direction of the sentiment trend with respect to the input tendency parameter has occurred, wherein the at least one notification is generated in real time as the change in the direction of the sentiment trend has occurred.

* * * * *